US010326698B2

(12) United States Patent
Wang et al.

(10) Patent No.: US 10,326,698 B2
(45) Date of Patent: Jun. 18, 2019

(54) KIND OF CONGESTION IMPROVEMENT METHOD BASED ON THE QUIC PROTOCOL

(71) Applicant: SICHUAN UNIVERSITY, Chengdu, Sichuan (CN)

(72) Inventors: Junfeng Wang, Chengdu (CN); Fuchun Sun, Chengdu (CN); Lixiang Liu, Chengdu (CN); Dong Liu, Chengdu (CN); Shiping Yang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 60 days.

(21) Appl. No.: 15/602,703

(22) Filed: May 23, 2017

(65) Prior Publication Data

US 2017/0353386 A1 Dec. 7, 2017

(30) Foreign Application Priority Data

Jun. 1, 2016 (CN) .......................... 2016 1 0382182

(51) Int. Cl.
*H04L 12/26* (2006.01)
*H04L 12/801* (2013.01)
*H04L 12/807* (2013.01)

(52) U.S. Cl.
CPC .......... *H04L 47/12* (2013.01); *H04L 43/0864* (2013.01); *H04L 47/27* (2013.01)

(58) Field of Classification Search
CPC ...... H04L 47/12; H04L 47/27; H04L 43/0864
See application file for complete search history.

(56) References Cited

U.S. PATENT DOCUMENTS

| 6,105,064 A * | 8/2000 | Davis ..................... H04L 47/10 709/224 |
| 7,719,967 B2 * | 5/2010 | Thakur .................. H04L 69/163 370/229 |

(Continued)

OTHER PUBLICATIONS

Cui, Y. et al, "Innovating Transport With QUIC: Design Approaches and Research Challenges", IEEE Internet Computing, Standards, Editor, Yong Cui, Published by the IEEE Computer Society, Mar./Apr. 2017, pp. 72-76.

(Continued)

*Primary Examiner* — Ivan O Latorre
(74) *Attorney, Agent, or Firm* — Gang Luo

(57) ABSTRACT

A kind of congestion improvement method based on the QUIC protocol adds the information of round trip delay in the congestion algorithm, self-adaptive changes the value of $\alpha$ to judge the situation of current network through comparison between the RTT of last time and the current RTT and then adjusts the current target window value in accordance with the current network situation, changing the congestion window based on the cubic growth curve of the cubic algorithm. This improvement method can make the QUIC protocol judge the current network situation more timely and accurately and can make the congestion window change quickly to fully utilize the bandwidth. The maximum congestion window limitation 200 exists in the QUIC protocol, which will not exceed 200 no matter how the congestion window grows. Such limitation largely reduces the throughput rate of QUIC protocol in the network environment with high bandwidth and long round trip delay.

6 Claims, 3 Drawing Sheets

(56) References Cited

U.S. PATENT DOCUMENTS

| | | | |
|---|---|---|---|
| 8,418,016 B2* | 4/2013 | Yamamoto | H04L 47/10 714/749 |
| 9,432,274 B1* | 8/2016 | Peon | H04L 1/00 |
| 2002/0089930 A1* | 7/2002 | Aceves | H04L 1/1832 370/230 |
| 2002/0150048 A1* | 10/2002 | Ha | H04L 1/1887 370/231 |
| 2004/0064577 A1* | 4/2004 | Dahlin | H04L 29/06 709/235 |
| 2004/0122969 A1* | 6/2004 | Ameigeiras | H04L 1/1854 709/235 |
| 2005/0286416 A1* | 12/2005 | Shimonishi | H04L 1/1671 370/229 |
| 2005/0289395 A1* | 12/2005 | Katsuyama | H04L 41/0631 714/25 |
| 2006/0023634 A1* | 2/2006 | Morandin | H04L 1/1809 370/252 |
| 2006/0171313 A1* | 8/2006 | Shimonishi | H04L 1/1874 370/229 |
| 2007/0115814 A1* | 5/2007 | Gerla | H04L 1/0002 370/230 |
| 2007/0177502 A1* | 8/2007 | Hama | H04L 1/1628 370/229 |
| 2007/0223395 A1* | 9/2007 | Lee | H04L 47/10 370/252 |
| 2008/0025216 A1* | 1/2008 | Singh | H04L 47/10 370/231 |
| 2008/0037420 A1* | 2/2008 | Tang | H04L 1/1607 370/229 |
| 2008/0225721 A1* | 9/2008 | Plamondon | H04L 47/10 370/235 |
| 2009/0073975 A1* | 3/2009 | Shimonishi | H04L 47/10 370/389 |
| 2010/0020689 A1* | 1/2010 | Tang | H04L 47/10 370/235 |
| 2011/0013516 A1* | 1/2011 | Black | H04L 43/0888 370/236 |
| 2013/0044598 A1* | 2/2013 | Zhang | H04L 43/0882 370/232 |
| 2013/0322246 A1* | 12/2013 | Zhou | H04L 47/11 370/235 |
| 2014/0185453 A1* | 7/2014 | Hwang | H04L 43/0864 370/236 |
| 2014/0192639 A1* | 7/2014 | Smirnov | H04L 47/10 370/230 |
| 2014/0241163 A1* | 8/2014 | Lee | H04W 48/16 370/235 |
| 2014/0269269 A1* | 9/2014 | Kovvali | H04W 24/08 370/229 |
| 2015/0188830 A1* | 7/2015 | Zhao | H04L 47/27 370/235 |
| 2017/0085483 A1* | 3/2017 | Mihaly | H04L 47/11 |
| 2017/0126574 A1* | 5/2017 | Goel | H04L 43/0882 |
| 2017/0195231 A1* | 7/2017 | Lopez Serrano | H04L 47/11 |
| 2017/0339729 A1* | 11/2017 | Szabo | H04W 28/0252 |
| 2017/0353386 A1* | 12/2017 | Wang | H04L 43/0864 |
| 2017/0366650 A1* | 12/2017 | Zhu | H04L 47/27 |
| 2018/0070263 A1* | 3/2018 | Falconetti | H04L 69/16 |
| 2018/0227801 A1* | 8/2018 | Dudda | H04W 28/02 |
| 2018/0278507 A1* | 9/2018 | Sintorn | H04L 43/16 |
| 2018/0324237 A1* | 11/2018 | Johansson | H04L 65/605 |

OTHER PUBLICATIONS

Sun, X. et al, "Analysis of RTT and RTO in TCP for Vertical Handovers", Microcomputer Applications, vol. 25, No. 5, Sep. 2004, pp. 513-518.

* cited by examiner

KIND OF CONGESTION IMPROVEMENT METHOD BASED ON THE QUIC PROTOCOL

FIELD OF TECHNOLOGY

This invention involves the application layer reliable transmission field of the computer networks based on the UDP (user datagram protocol), which involves a kind of congestion window improvement method based on the QUIC protocol in detail.

BACKGROUND TECHNOLOGY

In the year of 2013, Google company put forward the QUIC protocol, which realized the reliable transmission based on the UDP. The protocol is realized in Google Chrome, which is mainly committed to accelerating the access speed of the web page. As QUIC protocol is the application layer protocol based on UDP, it has higher efficiency when processing the packet loss and the initial connection. QUIC mainly solves two problems of the traditional TCP (Transmission Control Protocol). Firstly, the traditional TCP is the ordered transmission, which means that in TCP, if a packet loses, the subsequent packets can not submit the data to the application layer until the lost packet is retransmitted. However, UDP supports disordered transmission. If a packet loses, the subsequent packets can directly submit the data to the application layer for processing instead of waiting till the lost packet is retransmitted. Secondly, the traditional HTTPS (Hypertext Transfer Protocol Secure) protocol needs 1 TCP handshake connection of RTT (Data Packet Round Trip Delay) and 2 TLS (Transport Layer Security) connections of RTT. However, QUIC protocol only needs 0 handshake connection of RTT at the soonest to reach the same security as that of HTTPS.

In the test, it is found that in the environment with high bandwidth and high round trip delay, the transmission performance of QUIC is relatively bad, for which the main reasons are that: Firstly, the default congestion control algorithm adopted by QUIC protocol is cubic (cubic growth curve). Cubic is a kind of congestion control algorithm based on packet loss. As the cubic algorithm adopts the cubic growth curve which can quickly reach the congestion window value when packet loss happens last time after packet loss, improving the throughput rate under high bandwidth and high round trip delay product. However, cubic judges the network congestion situation based on the packet loss mainly, which cannot accurately judge the current network status. At the same time, its target window value only changes when packet loss happens, which cannot reflect the current network status in time. Also, under the environment with high bit error rate, the congestion window of cubic will reduce sharply, which cannot fully utilize the bandwidth. Secondly, in QUIC protocol, a maximum limitation 200 of it on the congestion window is founded. That means however big the bandwidth delay product is, it can only transmit 200 packets once at most, which has relatively big influence on its transmission performance. If the congestion windows of QUIC protocol are not limited, the congestion window will infinitely increase and the severe packet loss phenomenon will happen, which will make the throughput capacity of QUIC protocol worse.

Under the environment with long round trip delay and high bit error rate, using the congestion control method based on RTT such as TCP-Westwood and TCP-Vegas can improve the transmission performance of the data. TCP-Westwood evaluates the current bandwidth through measuring the returned interval time of ACK (confirmation) and the data size confirmed by ACK and modifies the slow start threshold value to the current bandwidth value when packet loss happens. However, TCP-Vegas mainly obtains the actual throughput rate and expected throughput rate through the minimum RTT and the RTT of current smoothing estimation and evaluates the queuing situation of the current queue in accordance with the different of both to evaluate the current network situation. However, in the actual environment, as the evaluation on RTT will be affected by a lot of noises, larger difference will appear, which will affect the change of the congestion window.

CONTENTS OF THE INVENTION

The technical problem that this invention aims to solve is a kind of congestion improve method based on QUIC protocol, which solves the low efficiency problem of QUIC protocol with high bandwidth and high round trip delay and improves the performance of QUIC protocol with high bit error rate at the same time.

To solve the technical problems, the technical program adopted in this inventions is:

A kind of congestion improve method based on QUIC protocol, which includes the steps as follows:

Step 1: Every time an ACK frame is received, using the formula last_SRTT=SRTT to update the value of the last SRTT and update the value of the current SRTT at the same time. For SRTT=0.875×SRTT+0.125×RTT, the last_SRTT therein is the smooth round trip delay which is calculated when ACK is received last time, SRTT is the smooth round trip delay and RTT is the round trip delay of the data packet;

Step 2: Judge if the current congestion window stays in the slow start stage; If it stays in the slow start stage, conduct window growth in accordance with the slow start way. If it stays in the congestion avoidance phase, the window growth way is:

Step 2.1: Judge the current network status

If the current window stays in the congestion avoidance phase, evaluate the diff which is the number of queueing packets in accordance with the current SRTT and the minimum RTT to judge the current network status; The calculation method of the mentioned diff is: Expected=cwnd/minRTT; Actual=cwnd/SRTT; diff=(Expected−Actual)×minRTT; Therein, cwnd is the congestion window value. MinRTT is the measured value of the minimum RTT. SRTT is the current smooth RTT. Expected is the expected throughput. And Actual is the actual throughput;

Step 2.2: Conduct self-adaptive change on the value of α

α is a parameter to judge the current network status. Set the original value of α as 1. Origin_cwnd is the target window value of the growth curves for cubic curve. SRTT is the current smooth RTT. Last_SRTT is the value of smooth RTT when the ACK frame is received last time. So the self-adaptive change method of α is:

1) If diff<α, SRTT is smaller than last_SRTT and α>1 at the same time, plus origin_cwnd with 1;
2) If diff<α, SRTT is bigger than last_SRTT and α>1 at the same time, deduct α by 1;
3) If diff<α and α is equal to 1, plus origin_cwnd wth 1;
4) If diff>α, SRTT is bigger than last_SRTT and at the same time α>1, deduct α with 1;
5) If diff>α and SRTT is smaller than last_SRTT, plus α by 1;

Step 2.3: Judge if the current congestion window has reached the maximum congestion window value.

If it has not reached, continue to conduct the change of congestion window; If it has reached, judge if the current network status is good through comparison between diff and α, for specific:

If diff>α, do not increase the value of maximum congestion window any more; If diff<α, increase the maximum congestion window value, i.e. max_cwnd=max_cwnd+100. At the same time, if cwnd>=300 at this time, set epoch_start as 0, set last_max_cwnd as the maximum congestion window value and set α as 1. Therein, max_cwnd is the maximum congestion window value, epoch_start is the moment when packet loss happens last time and last_max_cwnd is the congestion window value when packet loses last time.

In accordance with the program mentioned above, the mentioned slow start method for window growth in detail is: every time when one ACK is received, 1 window will be added.

In accordance with the program mentioned above, Step 3 is also included in:

If the congestion window value has not reached to the maximum, the method of changing the congestion window is:

If the congestion window value has not reached to the maximum at this time, the method of changing congestion window is: changing the congestion window through the formula $$W(t) = C(t-K)^3 + W_{origin}, K = \sqrt[3]{\frac{\beta W_{max}}{C}}$$

in accordance with the origin_cwnd and the curve growth of cubic curve which are calculated in Step 2. Therein, C is a parameter of cubic, t is the time interval from the time when packet loses last time till now, K is the time needed by the window growth to reach the window value of the packet loss last time and $W_{origin}$ is the target window value; In accordance with the maximum congestion window value and the congestion window values gotten by cubic curve, set the current congestion window as the smaller value of the max_cwnd and cwnd.

In accordance with the program mentioned above, Step4 is also included in:

If packet loss occurs in the window, reduce the current congestion window value and the maximum congestion window value, i.e. cwnd=cwnd*β, max_cwnd=max_cwnd*β. Therein, β is equal to 0.85.

Being compared with the current technology, the beneficial effects of this invention are:

1) This invention makes the throughput rate of QUIC protocol improves obviously under the network environment with high bandwidth and long round trip delay. At the same time, the throughput rate also improves obviously under the environment with high bit error rate.

2) A self-adaptive method is adopted by the maximum congestion window value, which makes the QUIC protocol not limited by the network with low bandwidth and low time delay and have good performance under the environment with high bandwidth and high round trip delay.

3) QUIC adopts the cubic growth curve of cubic and adopts the judgment information of RTT, which make the QUIC protocol judge the network situation more accurately and quickly. Especially under the environment with high bit error rate, QUIC protocol can quickly recover the congestion window to fully utilize the bandwidth after packet loss.

4) QUIC protocol is the application layer protocol based on UDP, which does not need to modify the Linux core when modifying the congestion algorithm.

SPECIFICATION OF THE ATTACHED FIGURES

SPECIFIC IMPLEMENTATION METHOD

Further specific specification is given as follows by combining the attached figures and the implementation method in detail. This invention puts forward the congestion window growth method based on the queuing delay. At the same time, the maximum congestion window can change adaptively. To make it convenient for description, this invention is described as QUIC+ (Quick Udp Internet Connection+). This invention can make the congestion window reach the target window value more quickly and finally make the performance of QUIC protocol better under environment with high bandwidth, high time delay and high bit error rate.

Figure 1:
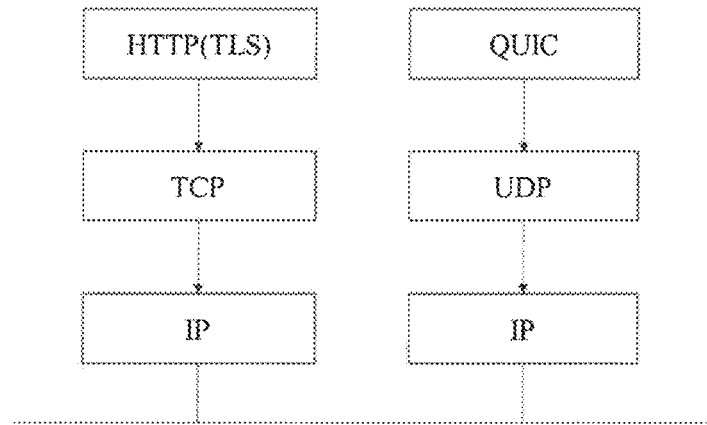
FIG. 1 shows the network architecture diagram which is based on QUIC protocol.

The architecture diagram of reliable transmission protocol QUIC based on UDP is as shown in FIG. 1, from which we can see that the QUIC protocol is the application layer protocol based on UDP and it solves many defects of TCP in application. At the same time, there is no need to modify the core code of Linux operating system for realizing QUIC in application layer, which is more convenient and simple for being realized.

The following steps are adopted for realizing this invention:

Step 1: Every time an ACK frame is received, using the formula last_SRTT=SRTT to update the value of the last SRTT (Smooth Round Trip Delay) and update the value of the current SRTT at the same time. For SRTT=0.875×SRTT+0.125×RTT, the last_SRTT therein is the smooth round trip delay which is calculated when ACK is received last time.

Step 2: Judge if the current congestion window stays in the slow start stage; If it stays in the slow start stage, conduct window growth in accordance with the slow start way, for which the method of adding 1 window every time one ACK is received can be adopted; If it stays in the congestion avoidance stage, conduct the window growth in accordance with Step 3 to Step 5.

Step 3: If the current window stays in the congestion avoidance stage, judge the current network status in accordance with the current SRTT and the minimum RTT, i.e. minRTT to evaluate the number diff of the packets in queue. The calculation method on diff is as follows:

Expected=cwnd/minRTT;

Actual=cwnd/SRTT;

diff=(Expected−Actual)×minRTT;

Therein, cwnd is the current congestion window value. MinRTT is the measured value of the minimum RTT. SRTT is the current smooth RTT. Expected is the expected throughput. And Actual is the actual throughput capacity.

Step 4: Conduct the self-adaptive change on the value of α by adopting the following method
1) If diff<α, SRTT is smaller than last_SRTT and α>1 at the same time, plus origin_cwnd with 1;
2) If diff<α, SRTT is bigger than last_SRTT and α>1 at the same time, deduct α by 1;
3) If diff<α and α is equal to 1, plus origin_cwnd wth 1;
4) If diff>α, SRTT is bigger than last_SRTT and at the same time α>1, deduct α with 1;
5) If diff>α and SRTT is smaller than last_SRTT, plus α by 1;

Therein, set the original value of α as 1, origin_cwnd as the target window value of the cubic growth curve, SRTT as the current smooth RTT and last_SRTT as the value of smooth RTT when ACK frame is received last time.

Step 5: Judge if the current congestion window has reached the maximum congestion window value. If it has not reached, continue to conduct change of the congestion window; If it has reached, judge if the current network status is good through comparison between diff and α; If diff>α, do not increase the value of the maximum congestion window as it means that the network is congested at this time; If diff<α, it means that the network status is good at this time. So increase the value of the maximum congestion window (max_cwnd) i.e. max_cwnd=max_cwnd+100; At the same time, if cwnd>=300 at this time, set epoch_start as 0, set last_max_cwnd as the current maximum congestion window and set α as 1. Therein, max_cwnd is the limited value of the maximum congestion window, epoch_start is the moment when packet loss happens last time and last_max_cwnd is the congestion window value last time the packet loss happens.

Step 6: If the congestion window value has not reached to the maximum at this time, conduct Step 7 and Step 8 to change the congestion window.

Step 7: Change the congestion window through the formula as follows in accordance with the origin_cwnd and the curve growth of cubic curve which are calculated in Step 4:

$$W(t) = C(t-K)^3 + W_{origin}, K = \sqrt[3]{\frac{\beta W_{max}}{C}}$$

Therein, C is a parameter of cubic, which is the constant. And t is the time interval from the time when packet loses last time till now, K is the time needed by the window growth to reach the window value of the packet loss last time and $W_{origin}$ is the target window value;

Step 8: In accordance with the maximum congestion window value and the congestion window values gotten by cubic curve, set the current congestion window as the smaller value of the max_cwnd and cwnd.

Step 9: If packet loss occurs, reduce the current congestion window value and the maximum congestion window value, i.e. cwnd=cwnd*β, max_cwnd=max_cwnd*β. Therein, β is equal to 0.85.

When this invention is applied in the network with high bandwidth and long round trip delay, as the traditional QUIC has maximum congestion window limitation and the recovery time is longer after packet loss happens, performance of QUIC protocol is relatively bad in the network with high bandwidth and long round trip delay; If the maximum congestion window of QUIC protocol is enlarged blindly, the window value of QUIC protocol will increase sharply and the severe packet loss phenomenon will occur, making the throughput capacity of QUIC protocol reduce. However, if the maximum congestion window of QUIC protocol is not increased, the QUIC protocol will not be able to fully utilize the bandwidth, affecting its throughput rate.

Figure 6:
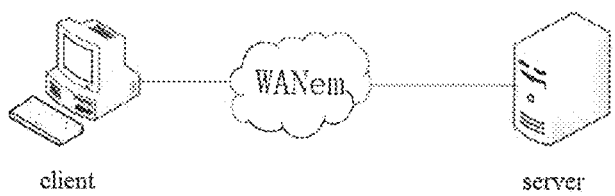
FIG. 6 shows the testing environment topology diagram of this invention.

This invention and its beneficial effects are further specified in detail through specific actual cases as follows. Firstly, establish the test environment in accordance with the environment topological graph as shown in FIG. 6. Therein, the client sides are the client side of QUIC protocol and that of HTTP protocol. The server side of QUIC protocol is quic_server and the server side of HTTP protocol is nginx server. The operating systems of both sides are ubuntu12.04.1. Both the QUIC protocol and the HTTP protocol conduct file download through the chromium browser of the client sides. WANem network simulator is established in the middle. Through WANem, a series of parameters such as the bandwidth, round trip delay, packet loss and etc. of the network can be set. Through the settings of different network parameters, compare the through rates of QUIC+ protocol, QUIC protocol and HTTP protocol.

Figure 2:
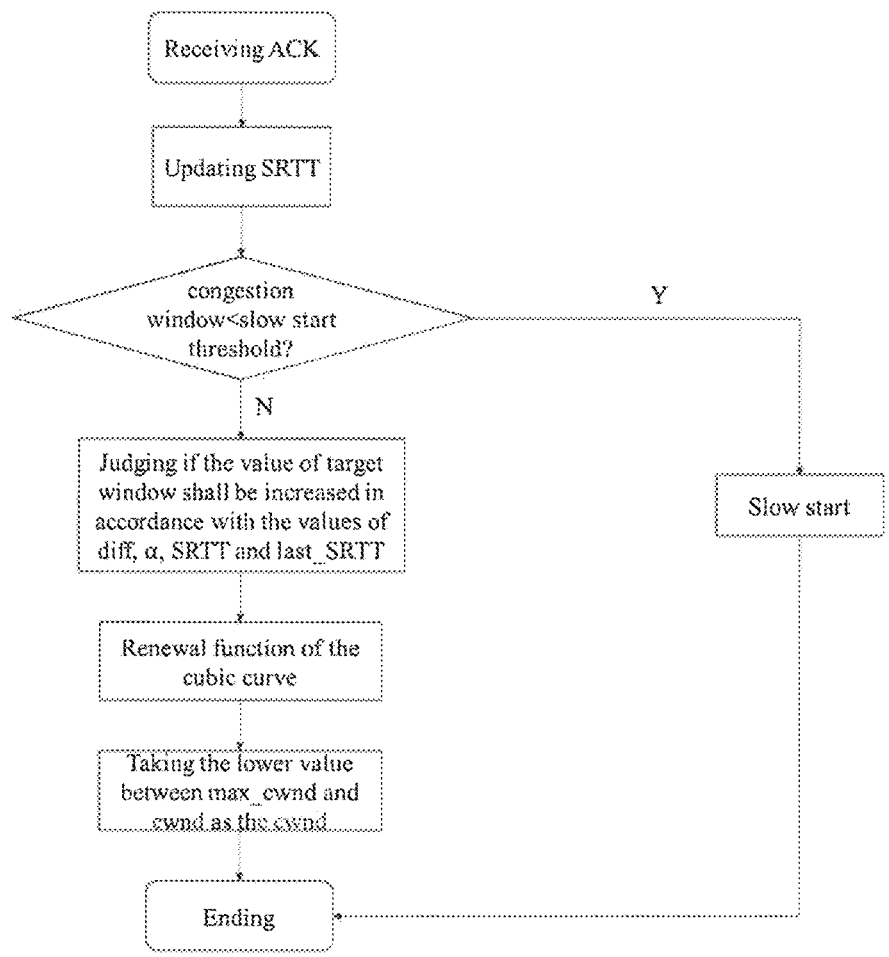
FIG. 2 shows the congestion control flow diagram of this invention QUIC+.
Figure 3:
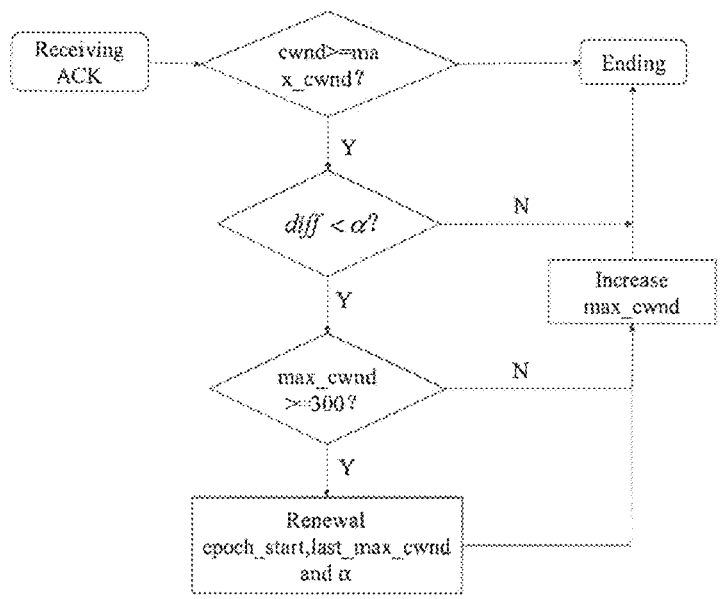
FIG. 3 shows the updating method and flow diagram of the maximum congestion window for this invention QUIC+.
Figure 4:
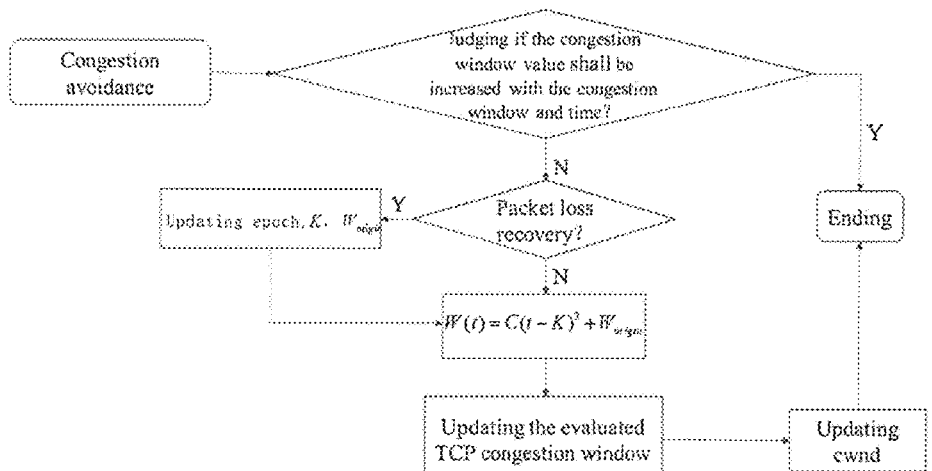
FIG. 4 shows the cubic growth curve flow diagram of QUIC for this invention.
Figure 5:
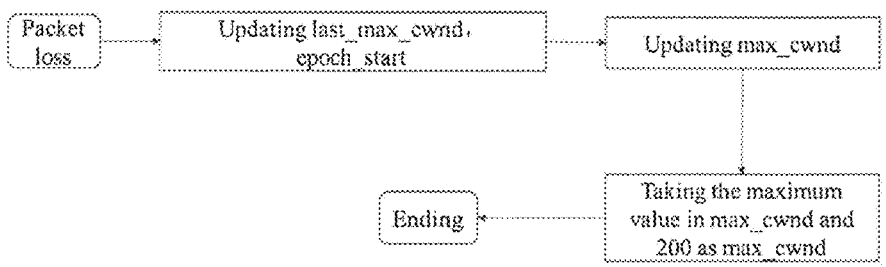
FIG. 5 shows the change flow diagram of congestion window to QUIC+ after packet loss for this invention.

The congestion control method of QUIC+ protocol is further specified by combining Attached FIG. 2: Step 1: Calculate RTT in accordance with the arrival time of the current ACK every time the receiving end receives an ACK frame and then calculate the smooth RTT calculated when the ACK is received last time, i.e. last_SRTT=SRTT. And then calculate that SRTT=0.875×SRTT+0.125×RTT; Step 2: Calculate diff which is the number of packets in queue in accordance with the minimum RTT and the current SRTT, diff=(cwnd/minRTT−cwnd/SRTT)×minRTT; Step 3: Evaluate the current network situation and judge if to increase the value of the target window through judgment on the RTT and judgment on the value of diff and α at the same time, conduct the adaptive change on the value of α; Step 4: Judge if to increase the value of maximum congestion window currently in accordance with the value of diff and α in combination with what is shown in Attached FIG. 3; Step 5: Utilize the cubic curve growth function to change the congestion window of QUIC+ for the target window calculated in the above step in combination with Attached FIG. 5; Step 6: If the congestion window calculated currently has exceeded the maximum congestion window, set the maximum congestion window value as max_cwnd; Step 7: If packet loss occurs, change the current congestion window and the maximum congestion window in accordance with the flow diagram in Attached FIG. 5.

Compare the QUIC+ protocol with QUIC protocol and HTP protocol of this invention. Test that the network simulator which is established is WANem and simulate the bandwidth, RTT and bit error rate of the link through WANem.

Figure 7:
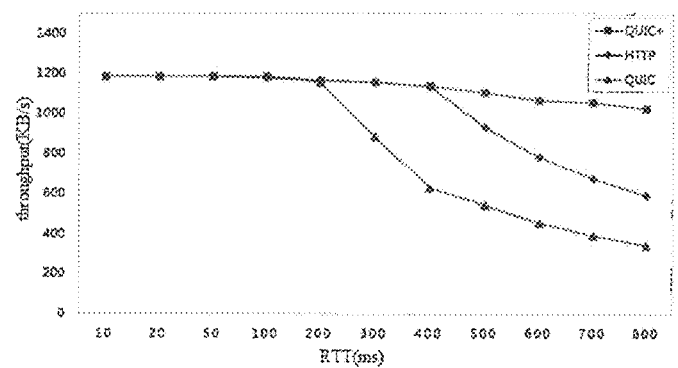
FIG. 7 shows the throughput capacity comparison of QUIC+ protocol, QUIC protocol and HTTP (Hyper Text Transfer Protocol) along with the change of RTT when bandwidth is 10 Mbps and bit error rate is 0.

As shown in Attached FIG. 7, along with the increasing of RTT, as the limitation of maximum congestion window is 200, performance of the original QUIC protocol reduces sharply. However, the maximum congestion window value of QUIC+ protocol can conduct self-adaptive change. At the same time, as the judgment of QUIC+ protocol on the network situation is more timely and accurate, the throughput capacity of QUIC is improved.

Figure 8:
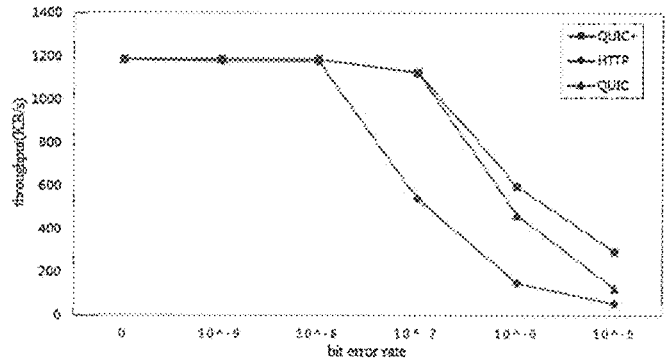
FIG. 8 shows the throughput capacity comparison of QUIC+ protocol, QUIC protocol and HTTP (Hyper Text Transfer Protocol) along with the change of bit error rate when bandwidth is 10 Mbps and RTT is 50 ms.

As shown in Attached FIG. 8, along with the increasing of the bit error rate, as the judgment of QUIC+ protocol on the network situation is more timely and accurate, it can recover the congestion window before packet loss more quickly. Thus, the throughput capacity is obviously better than that of the original QUIC protocol; At the same time, as the bottom layer of QUIC protocol is UDP, it does not need to transmit according to the order of sequence and it does not need to wait for the arrival of the previous packets after packet loss. Thus, the throughput capacity is better than that of the HTTP protocol.

Figure 9:
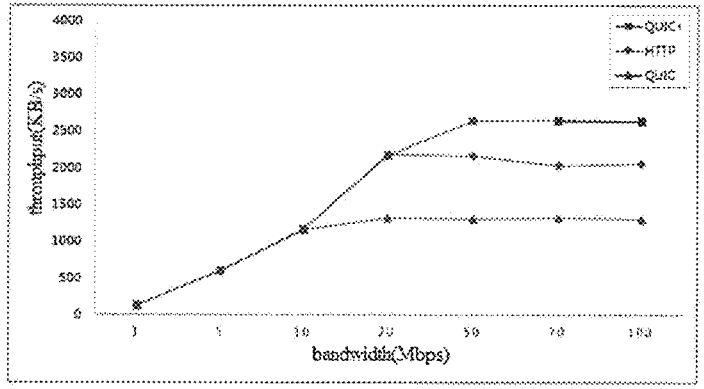
FIG. 9 shows the throughput capacity comparison of QUIC+ protocol, QUIC protocol and HTTP (Hyper Text Transfer Protocol) along with the change of bandwidth when RTT=200 ms and bit error rate is 0.

As shown in Attached FIG. 9, along with the increasing of the bit error rate, along with the increasing of the bandwidth, as the limitation of maximum congestion window is 200, performance of the original QUIC protocol reduces sharply. However, the maximum congestion window value of QUIC+ protocol can conduct self-adaptive change. At the same time, as the judgment of QUIC+ protocol on the network situation is more timely and accurate, the throughput capacity of QUIC is improved.

The invention claimed is:

1. A congestion improvement method based on QUIC (Quick UDP (user datagram protocol) Internet Connection) protocol, comprising the steps as follows:
   Step 1: every time an ACK frame is received, using formula last_SRTT=SRTT to update a value of last SRTT (Smooth RTT (Round Trip Delay)) and update a value of current SRTT at the same time, wherein SRTT is smooth round trip delay and RTT is round trip delay of data packet;
   the last_SRTT is smooth round trip delay which is calculated by SRTT=0.875×SRTT+0.125×RTT when ACK is received last time;
   Step 2: determining if a congestion window stays in a slow start stage; if the congestion window stays in the slow start stage, conducting window growth in accordance with a slow start way; if the congestion window stays in a congestion avoidance phase, conducting window growth as follows:
   Step 2.1: determining network status as follows:
   if the congestion window stays in the congestion avoidance phase, evaluating diff which is a number of queuing packets in accordance with the SRTT and a minimum RTT to determine the network status; the diff being calculated by: Expected=cwnd/minRTT; Actual=cwnd/SRTT; diff=(Expected−Actual)×minRTT; where, cwnd is a congestion window value, minRTT is a measured value of the minimum RTT, SRTT is the smooth RTT, Expected is an expected throughput of the network, and Actual is an actual throughput capacity of the network;
   Step 2.2: conducting adaptive change of parameter α
   setting an original value of α as 1, wherein α is a parameter to determine the network status, origin_cwnd is a target congestion window value of a curve growth of a cubic curve, and the adaptive change is conducted by a self-adaptive change method of α as follows:
   1) if diff<α, SRTT is smaller than last_SRTT and α>1 at the same time, increasing origin_cwnd by 1;
   2) if diff<α, SRTT is bigger than last_SRTT and α>1 at the same time, reducing α by 1;
   3) if diff<α and α is equal to 1, increasing origin_cwnd by 1;
   4) if diff>α, SRTT is bigger than last_SRTT and at the same time α>1, reducing α by 1;
   5) if diff>α and SRTT is smaller than last_SRTT, increasing α by 1;
   Step 2.3: determining if the congestion window has reached maximum congestion window value;
   if the congestion window has not, continuing to conduct change of the congestion window; if the congestion window has, performing comparison between diff and α, as follows:
   if diff>α, taking no action to increase the maximum congestion window value; if diff<α, increasing the maximum congestion window value by max_cwnd=max_cwnd+100; at the same time, if cwnd>=300, setting epoch_start as 0, setting last_max_cwnd as the maximum congestion window value and setting α as 1, where, max_cwnd is a limited value of the maximum congestion window value, epoch_start is a moment when a packet was lost last time and last_max_cwnd is the maximum congestion window value at the packet loss.

2. The congestion improvement method based on QUIC protocol in claim 1, wherein the slow start way is that: every time when an ACK is received, the congestion window value is increased by one.

3. The congestion improvement method based on QUIC protocol in claim 1, further comprising Step 3 as follows:
   if the congestion window value has not reached to the maximum congestion window value, changing congestion window value W through formula $$W(t) = C(t-K)^3 + W_{origin}, K = \sqrt[3]{\frac{\beta W_{max}}{C}}$$

in accordance with the origin_cwnd and the curve growth of the cubic curve which are calculated in Step 2, where, C is a parameter of the cubic curve, t is lapse of time since the packet loss, β is equal to 0.85, Wmax is the maximum congestion window value, K is time needed by the window growth to reach the congestion window value at the time of the packet loss and $W_{origin}$ is target congestion window value; in accordance with the maximum congestion window value and the congestion window value obtained by cubic curve, setting the congestion window value as the smaller value of the max_cwnd and cwnd.

4. The congestion improvement method based on QUIC protocol in claim 3, further comprising Step 4 as follows:
   if packet loss occurs, reducing the congestion window value and the maximum congestion window value by cwnd=cwnd*β,max_cwnd=max_cwnd*β.

5. The congestion improvement method based on QUIC protocol in claim 2, further comprising Step 3 as follows:
   if the congestion window value has not reached to the maximum congestion window value, changing congestion window value W through formula $$W(t) = C(t-K)^3 + W_{origin}, K = \sqrt[3]{\frac{\beta W_{max}}{C}}$$

in accordance with the origin_cwnd and the curve growth of the cubic curve which are calculated in Step 2, where, C is a parameter of the cubic curve, t is lapse of time since the packet loss, $\beta$ is equal to 0.85, Wmax is the maximum congestion window value, K is time needed by the window growth to reach the congestion window value at the time of the packet loss and $W_{origin}$ is target congestion window value; in accordance with the maximum congestion window value and the congestion window value obtained by cubic curve, setting the congestion window value as the smaller value of the max_cwnd and cwnd.

6. The congestion improvement method based on QUIC protocol in claim 5, further comprising Step 4 as follows:
if packet loss occurs, reducing the congestion window value and the maximum congestion window value by cwnd=cwnd*$\beta$,max_cwnd=max_cwnd*$\beta$.

\* \* \* \* \*